United States Patent [19]
Zecevic

[11] 3,982,323
[45] Sept. 28, 1976

[54] COMBINATION INTERPOLATOR AND DISTANCE DIVIDER

[75] Inventor: Vuk Zecevic, Chicago, Ill.

[73] Assignee: Jake Matiosian, Chicago, Ill. ; a part interest

[22] Filed: July 7, 1975

[21] Appl. No.: 593,259

[52] U.S. Cl. .................................. 33/1 C; 33/76 R; 33/93; 33/104
[51] Int. Cl.² ............................................. G01B 3/00
[58] Field of Search ....... 33/1 R, 1 C, 76 R, 76 VA, 33/75 R, 111, 93, 92, 104

[56] References Cited
UNITED STATES PATENTS

| | | | |
|---|---|---|---|
| 611,697 | 10/1898 | Lundy | 33/76 |
| 986,248 | 3/1911 | Van Duyne | 33/76 |
| 2,547,955 | 4/1951 | Marsh | 33/76 |
| 3,010,210 | 11/1961 | Snell | 33/76 X |
| 3,046,662 | 7/1962 | Chabot, Jr. | 33/76 |

Primary Examiner—William D. Martin, Jr.
Attorney, Agent, or Firm—Edward C. Threedy

[57] ABSTRACT

A contour interpolator and distance divider comprising an instrument which converts a mathematical operation directly into a graphic solution, including a scale device where there are a plurality of scales extending in parallel relation running in consecutive numbers in opposite directions and an adjustably mounted instrument support positioned in relation to the scales and cooperating therewith to adjustably position over the scales a plotting instrument from which contour interpolations may be determined.

1 Claim, 5 Drawing Figures

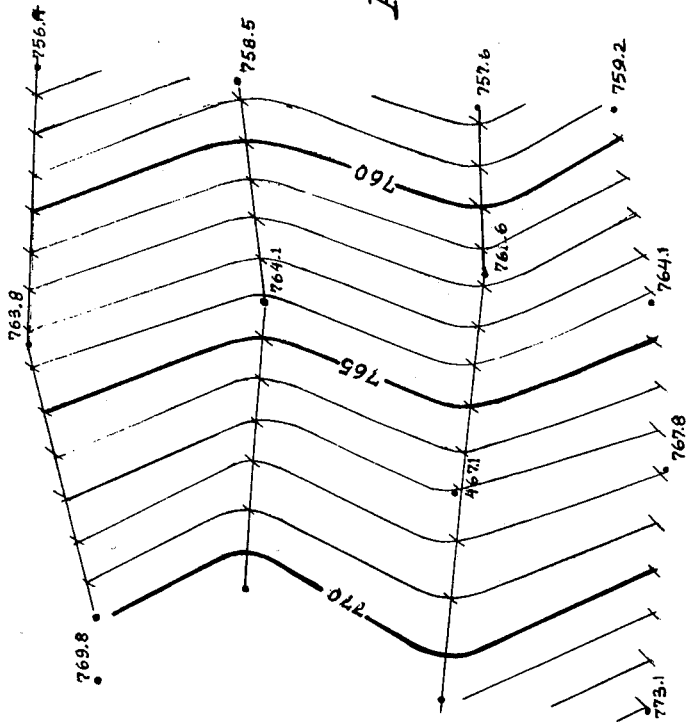

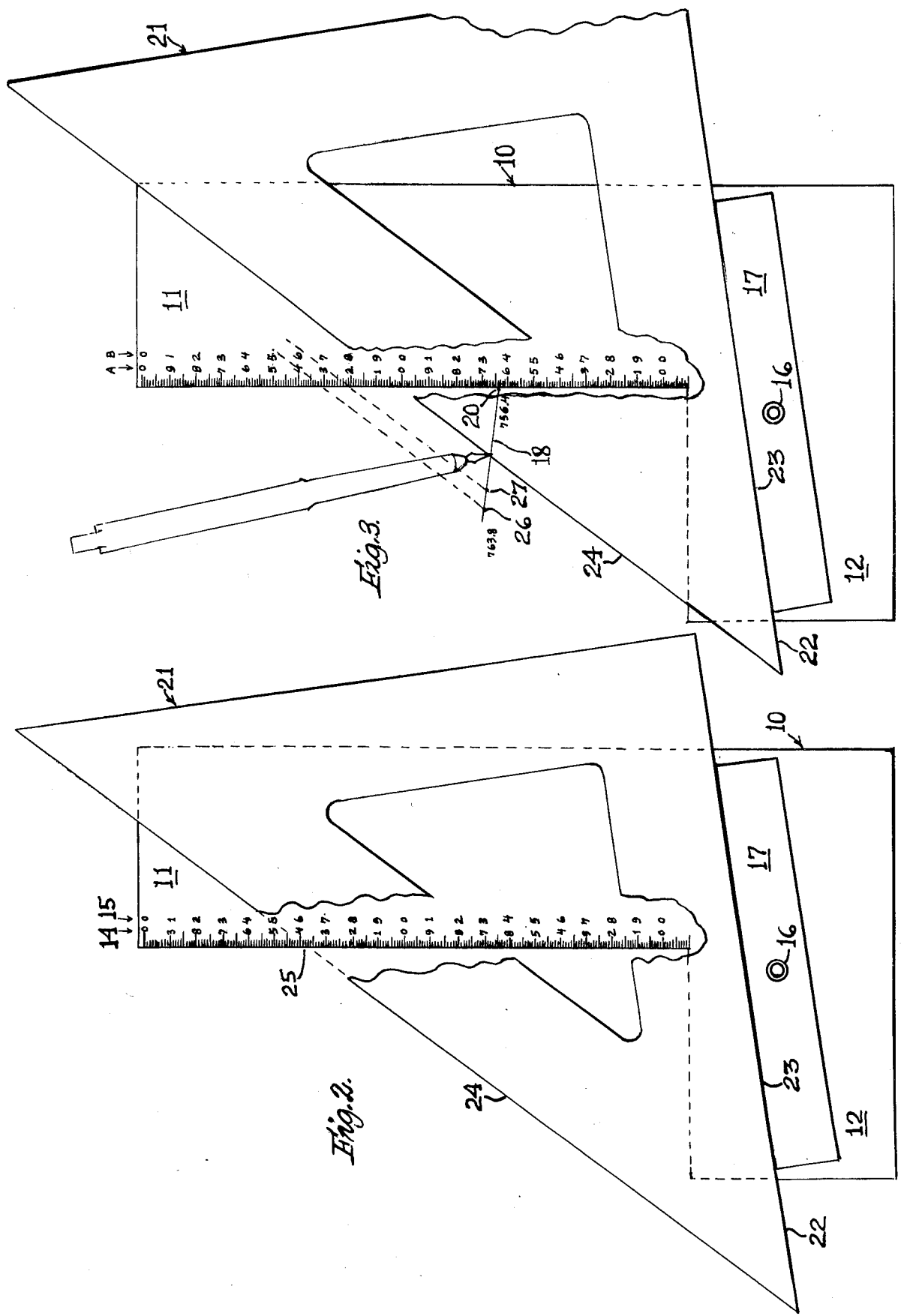

COMBINATION INTERPOLATOR AND DISTANCE DIVIDER

SUMMARY OF THE INVENTION

The contour interpolator and distance divider of this invention is primarily useful for surveyors, architects, civil engineers, and related technicians and draftsmen. It is utilized to convert a mathematical operation directly into a graphic solution.

The conventional way of interpolating between two given elevations involves a combination of mathematical and geographic operations. My improved instrument for ascertaining the correct contour interpolations as well as a distance divider, comprises an L-shaped body, the elongated leg of which adjacent one longitudinal edge is provided with a pair of numerical scales, each comprising a numeral series 0 through 9, with the scales running in opposite directions. The base portion of the instrument provides an adjustable mounting which supports a straight-edge type ruler that is utilized with the scale to ascertain the correct contour interpolations as sought.

GENERAL DESCRIPTION

The invention will be best understood by reference to the accompanying drawings showing the preferred form of embodiment of the invention, in which:

FIG. 1 is a perspective view of the invention;

FIG. 2 is a plan view of the invention showing in part a drafting instrument operatively associated therewith;

FIG. 3 is a view similar to FIG. 2, showing the effects of the operation of the instrument;

FIG. 4 is a fragmentary view of the contour plot; and

FIG. 5 is a graphic scale representation of one means of ascertaining contour interpolations.

The conventional way of interpolating between two given elevations involves the following mathematical procedures. For example, by reference to FIG. 4, one is given two elevations: 756.4 and 763.8, which are scaled from the contour plan. The latter elevation is subtracted from the higher, and the distance (expressed by D) divided by the difference in the elevations (the latter expressed by H). A constant (expressed as (D/H) will be multiplied by 1 because the elevations between these contour lines are constant and equal. With respect to the last segment as shown in the chart depicted in FIG. 5, the remaining distance (expressed as $d3$) will be obtained by multiplying the constant (D/H) by the remaining elevation (expressed as $h3$).

Mathematically expressed, this operation will be:

$$\frac{D}{H} = \frac{d1}{h1} = \frac{d2}{h2} = \frac{d3}{h3}$$

and thus $$d1 = (D/H) \times h1$$

$$d2 = (D/H) \times h2$$

$$d3 = (D/H) \times h3$$

all of which are represented on the chart shown in FIG. 5.

During this operation there are employed both a slide rule and a scale. The units in which the distance is scaled can be in the metric system or in fractions of an inch without changing the mathematical operation as set forth above.

The present invention simplifies the procedure and does not require any special knowledge pertaining to the use of a slide rule or a scale.

A simplified method of plotting contours and dividing distance is obtained through the use of the instrument of the present invention. Referring to FIG. 1, there is shown a drafting instrument 10 which is generally L-shaped in configuration and, as such, provides an upstanding elongated leg 11 and a transversely extending base 12. One longitudinal edge 13 of the leg 11 is provided with two sets of scales 14 and 15. It will be noted that the scales 14 and 15 are arranged side by side so as to extend through a double series of numerals 0 through 9, with the scale 14 extending vertically upwardly from the base 12, while the scale 15 extends in a reverse direction vertically toward the base 12.

Pivotally mounted on the instrument 10 by a suitable connector 16 is an instrument support 17. This support 17 consists of a rectangularly shaped member adapted to be pivoted about the connector 16 in the manner and for the purpose hereinafter described. The support can be connected to the base 12 by means of a bolt and wing nut so that it may be releasably locked in any desired adjusted position.

When the two contour points which are to be interpolated are determined—such, for example, on FIG. 4 the points 756.4 and 763.8—the user of the instrument will plot these points and connect them with a line 18. The instrument 10 will then be placed over the plot, with the base line 19 of the base 12 substantially parallel to the plotted line 18. The positioning of the instrument 10 onto the plot is not critical, so that such a relation between the base line 19 and the plotted line 18 may be approximate. The innermost point 20 on the plotted line 18, which represents the elevation 756.4, is placed against the scale 14 at the first point thereon representing the last two digits on the plot, to-wit, "64."

In use with the instrument 10, there is employed a 45° triangle 21, preferably made from clear acrylic plastic so that the scales 14 and 15 will be visible at all times. The base leg 22 of the triangle 21 is placed upon the supporting edge 23 of the adjustable support 17, as shown in FIG. 2, with the support 17 then being adjusted about its connection 16 until the hypotenusal edge 24 of the triangle intercepts the scale 14 at a point corresponding to the last two digits "38" of the higher elevational point, 763.8. As shown in FIG. 2, this edge will intercept the scale 14 of the leg 11 at the point indicated at 25. By holding the support 17 in an adjusted position, the triangle 21 is then slid along the support edge 23 of the support 17 from left to right, lowering the edge 24 of the triangle 21 such that it will intercept the scale 14 at each succeeding decreasing numeral thereon. As shown in FIG. 3, the first interpolated point developed through the use of the instrument arrives when the edge 24 of the triangle 21 intercepts the numeral 3, with the resulting interception of this edge 24 at point 26 being drawn on the plotted line 18, followed by the next successive point 27 determined when the edge 24 of the triangle 21 intersects the numeral 2 on the scale 14, etc. The points 26 and 27 then represent contour lines 763 and 762, respectively.

Thus, through the use of my instrument, the contour lines have been quickly and conveniently plotted between the elevational points 756.4 and 763.8.

The scale 15 on the instrument 10 will be used when the plotted line between the contour points has resulted in a reverse slope.

When the instrument 10 is to be used as a distance divider and one wishes to determine the distance between two plotted points, the instrument will be placed on plotted points, with the number "0" of the scale 14 positioned on the lower valued point, again adjusting the instrument 10 so that its base line 19 approximates a parallel to the plotted line to be divided by distances, and with the triangle 21 placed upon the supporting edge 23 of the support 17, all adjusted about the connection 16 so that the edge 24 of the triangle 21 intercepts the scale at the first coinciding "0 0" of the scales 14 and 15. In this example, this point is chosen when the distances between the two points are to be divided into 10 equal parts.

This distance could be divided into five parts by using the same positions of the instrument and plotting every second number.

The distance between the plotted points can be divided into proportional parts or fractions by using corresponding numbers on the scale 15.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A contour interpolator and distance divider instrument comprising
   a. a substantially flat body member formed from a molded one-piece L-shaped member providing an elongated leg and a base portion extending at right angles thereto,
   b. numerical scales including two sets of a series of numerals, with the series in one set progressively proceeding in an opposite direction along one edge of said elongated leg that joins with the top edge of said base portion,
   c. an adjustable instrument support mounted on said base portion providing an elongated supporting edge extending beneath the top edge of said base portion,
   d. means connecting said instrument support to said base portion of said body for pivotal movement about a fixed axis, and
   e. a straight-edge instrument having one edge positionable upon said support and another edge movable over said numeral scales and said one edge of said leg as said support is pivoted into a predetermined position.

* * * * *